(12) United States Patent
Tang (10) Patent No.: US 12,510,756 B2
(45) Date of Patent: Dec. 30, 2025

(54) OPTICAL APPARATUS AND NEAR-EYE DISPLAY DEVICE

(71) Applicant: VIVO MOBILE COMMUNICATION CO., LTD., Dongguan (CN)

(72) Inventor: Weiping Tang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 433 days.

(21) Appl. No.: 18/091,501

(22) Filed: Dec. 30, 2022

(65) Prior Publication Data

US 2023/0145899 A1 May 11, 2023

Related U.S. Application Data

(63) Continuation of application No. PCT/CN2021/103589, filed on Jun. 30, 2021.

(30) Foreign Application Priority Data

Jul. 3, 2020 (CN) .......................... 202010636052.3

(51) Int. Cl.
*G02B 27/00* (2006.01)
*G02B 27/01* (2006.01)
*G02B 27/28* (2006.01)

(52) U.S. Cl.
CPC ....... *G02B 27/0172* (2013.01); *G02B 27/288* (2013.01)

(58) Field of Classification Search
CPC ............. G02B 27/0172; G02B 27/288; G02B 2027/0178; G02B 27/283; G02B 27/286;
(Continued)

(56) References Cited

U.S. PATENT DOCUMENTS

| 10,007,118 B2 | 6/2018 | Border |
| 2015/0205128 A1 | 7/2015 | Border |

(Continued)

FOREIGN PATENT DOCUMENTS

| CN | 107589546 A | * 1/2018 |
| CN | 108897136 A | 11/2018 |

(Continued)

OTHER PUBLICATIONS

International Search Report issued in corresponding International Application No. PCT/CN2021/103589, mailed Sep. 26, 2021, 5 pages.
First Office Action issued in related Chinese Application No. 202010636052.3, mailed Aug. 25, 2021, 12 pages.

*Primary Examiner* — Henry Duong
(74) *Attorney, Agent, or Firm* — IPX PLLC (57) ABSTRACT

An optical apparatus and a near-eye display device are provided. The optical apparatus includes a light source, an angle selection unit, a light conversion unit, a first polarization unit, a second polarization unit, and a lens. The first polarization unit is disposed on a light-emitting side of the light source; a first surface of the first polarization unit faces a light-emitting surface of the light source; the angle selection unit is disposed opposite the first polarization unit; the light conversion unit is disposed on a side, away from the first polarization unit, of the angle selection unit; the second polarization unit is disposed opposite the angle selection unit; and the lens is disposed opposite the light conversion unit.

18 Claims, 3 Drawing Sheets

(58) Field of Classification Search
CPC .......................... G02B 27/0101; G02B 27/01;
G02B 27/0103; G02B 27/0149; G02B
27/017; G02B 27/0176; G02B 27/0189;
G02B 27/0179; G02B 2027/0105; G02B
2027/0107; G02B 2027/0109; G02B
2027/011; G02B 2027/0112; G02B
2027/0114; G02B 2027/0116; G02B
2027/0118; G02B 2027/012; G02B
2027/0121; G02B 2027/0125; G02B
2027/0123; G02B 2027/0127; G02B
2027/0129; G02B 2027/013; G02B
2027/0132; G02B 2027/0134; G02B
2027/0136; G02B 2027/0138; G02B
2027/014; G02B 2027/0141; G02B
2027/0143; G02B 2027/0145; G02B
2027/0147; G02B 2027/015; G02B
2027/0152; G02B 2027/0154; G02B
2027/0156; G02B 2027/0158; G02B
2027/0159; G02B 2027/0161; G02B
2027/0163; G02B 2027/0165; G02B
2027/0167; G02B 2027/0174; G02B
2027/0169; G02B 2027/0181; G02B
2027/0183; G02B 2027/0185; G02B
2027/0187; G02B 2027/019; G02B
2027/0192; G02B 2027/0194; G02B
2027/0196; G02B 2027/0198
USPC ....................................................... 359/630
See application file for complete search history.

(56) References Cited

U.S. PATENT DOCUMENTS

| 2019/0072800 | A1 | 3/2019 | Narushima |
| 2020/0041790 | A1 | 2/2020 | Martinez et al. |
| 2020/0117007 | A1 | 4/2020 | Smithwick et al. |

FOREIGN PATENT DOCUMENTS

| CN | 109387942 | A | | 2/2019 | |
| CN | 110161688 | A | | 8/2019 | |
| CN | 110208948 | A | | 9/2019 | |
| CN | 209842241 | U | | 12/2019 | |
| CN | 209842242 | U | | 12/2019 | |
| CN | 210072209 | U | | 2/2020 | |
| CN | 111158154 | A | | 5/2020 | |
| CN | 210488131 | U | * | 5/2020 | |
| CN | 111221130 | A | | 6/2020 | |
| CN | 111273449 | A | | 6/2020 | |
| CN | 111338086 | A | | 6/2020 | |
| CN | 111638602 | A | | 9/2020 | |
| IN | 110286489 | A | | 9/2019 | |
| IN | 111025659 | A | | 4/2020 | |
| JP | 2018036501 | A | | 3/2018 | |
| JP | 2019045858 | A | | 3/2019 | |
| KR | 20130116548 | A | | 10/2013 | |
| KR | 20180050838 | A | | 5/2018 | |
| WO | 2020028869 | A1 | | 2/2020 | |
| WO | WO-2020119320 | A1 | * | 6/2020 | ......... G02B 27/0101 |

* cited by examiner

OPTICAL APPARATUS AND NEAR-EYE DISPLAY DEVICE

CROSS-REFERENCE TO RELATED APPLICATIONS

This application is a continuation of International Application No. PCT/CN2021/103589, filed Jun. 30, 2021, which claims priority to Chinese Patent Application No. 202010636052.3, filed Jul. 3, 2020. The entire contents of each of the above-referenced applications are expressly incorporated herein by reference.

TECHNICAL FIELD

This application relates to the field of optical technologies, and specifically, to an optical apparatus and a near-eye display device.

BACKGROUND

In a near-eye display system, an image to be displayed usually needs to be amplified for displaying. In the prior art, the image is usually amplified by increasing a distance between a light source (for example, a display screen of an electronic device) and an optical apparatus (for example, a near-eye display apparatus) to enlarge a field of view of the optical apparatus, so that lights reflected by an image enter a human eye along an optical path changed by the optical apparatus, thereby achieving an effect of amplifying the image. However, in order to enable the optical apparatus to completely receive all lights in the field of view, a light inlet having a large caliber usually needs to be formed in the optical apparatus, which causes a problem that an overall thickness of the optical apparatus is large.

SUMMARY

Embodiments of this application provide an optical apparatus and a near-eye display device.

According to a first aspect, an embodiment of this application provides an optical apparatus, including a light source, an angle selection unit, a light conversion unit, a first polarization unit, a second polarization unit, and a lens, where the first polarization unit is disposed on a light-emitting side of the light source; a first surface of the first polarization unit faces a light-emitting surface of the light source; the angle selection unit is disposed opposite the first polarization unit; the light conversion unit is disposed on a side, away from the first polarization unit, of the angle selection unit; the second polarization unit is disposed opposite the angle selection unit; and the lens is disposed opposite the light conversion unit.

According to a second aspect, an embodiment of this application provides a near-eye display device, including the optical apparatus.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that data used in this way may be interchangeable in an appropriate case, so that the embodiments of this application can be implemented in a sequence other than those shown or described herein, and objects distinguished by "first" and "second" are generally of a same type, and a quantity of objects is not limited. For example, there may be one or more first targets. In addition, in the specification and the claims, "and/or" represents at least one of connected objects, and a character "/" generally represents an "or" relationship between associated objects.

With reference to the accompanying drawings, the following describes in detail an optical apparatus in the embodiments of this application based on specific embodiments and application scenarios thereof.

Referring to FIG. 1 to FIG. 4, an embodiment of this application provides an optical apparatus. The optical apparatus includes a light source 100, an angle selection unit 200, a light conversion unit 300, a first polarization unit 400, a second polarization unit 500, and a lens 600. The first polarization unit 400 is disposed on a light-emitting side of the light source 100. A first surface of the first polarization unit 400 faces a light-emitting surface of the light source 100. The angle selection unit 200 is disposed opposite the first polarization unit 400. The light conversion unit 300 is disposed on a side, away from the first polarization unit 400, of the angle selection unit 200. The second polarization unit 500 is disposed opposite the angle selection unit 200. The lens 600 is disposed opposite the light conversion unit 300.

The light source 100 may be a point light source or a surface light source, for example, may be a surface light source formed when a display screen of an electronic device displays an image. A propagation path of a light emitted by the light source 100 can be changed by the optical apparatus, so that content displayed in the display screen can be not only amplified but also projected in a specified direction.

The first polarization unit 400 may include one or more first polarizers that are laminated. The first polarizer may be an absorbent polarizer. When the first polarization unit 400 includes a plurality of first polarizers that are laminated, directions of light-transmitting axes of all the first polarizers are the same. In addition, the first polarization unit 400 may be a lens group composed of a plurality of optical lenses. Lights emitted by the light source 100 may be reflected and/or refracted multiple times by the plurality of optical lenses, to form polarized lights. The following uses a first direction to denote a direction of a light-transmitting axis of the first polarization unit 400. In this case, after lights emitted by the light source 100 are transmitted to the first polarization unit 400, only lights vibrating in the first direction can pass through the first polarization unit 400, while lights vibrating in other directions are blocked by the first polarization unit 400.

Figure 1:
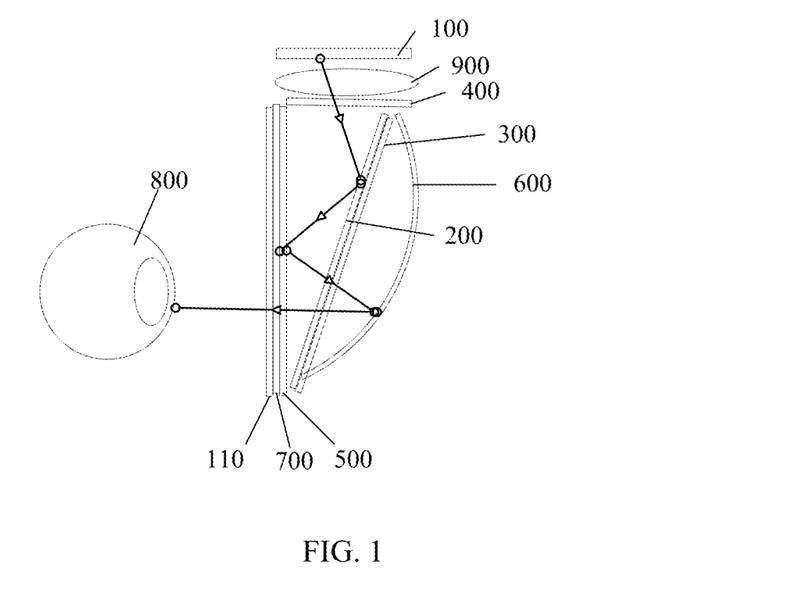
FIG. 1 is a first schematic structural diagram of an optical apparatus according to an embodiment of this application.

Referring to FIG. 1, a first end of the angle selection unit 200 is spaced from a first end of the second polarization unit 500, to form a light inlet 120 between the angle selection unit 200 and the second polarization unit 500. The light emitted by the light source 100 can enter space between the angle selection unit 200 and the second polarization unit 500 through the light inlet 120. The first end of the angle selection unit 200 is an end, close to the first polarization unit 400, of the angle selection unit 200. The first end of the second polarization unit 500 is an end, close to the first polarization unit 400, of the second polarization unit 500.

The first polarization unit 400 may be disposed opposite the light inlet 120. In this way, after passing through the first polarization unit 400, the light emitted from the light-emitting surface of the light source 100 can enter the space between the angle selection unit 200 and the second polarization unit 500 from the light inlet 120. Because the direction of the light-transmitting axis of the first polarization unit 400 is the first direction, that is, after the lights emitted from the light-emitting surface of the light source 100 are transmitted to the first polarization unit 400, only the light vibrating in the first direction can pass through the first polarization unit 400, it is ensured that all lights entering the space between the angle selection unit 200 and the second polarization unit 500 are linearly polarized lights that vibrate in the first direction. In this way, it can be ensured that all lights entering the optical apparatus have a same vibration direction. In addition, a second polarization unit 500 is provided. The second polarization unit 500 is opposite the angle selection unit. An impact of stray light on an imaging effect can be further avoided by setting directions of light-transmitting axes of the first polarization unit and the second polarization unit, thereby improving an imaging effect of the optical apparatus.

The angle selection unit 200 may include a light-transmitting body and an angle selection film disposed on a surface of the light-transmitting body. The angle selection film can reflect an incident light in a certain angle range (for example, 0° to 45°), and can transmit an incident light in another angle range (for example, 45° to 90°). The following uses a first range to denote an angle range in which a light can pass through the angle selection film, and uses a second range to denote the angle range in which a light is reflected by the angle selection film.

The angle selection film may use a common structure of an angle selection film in the prior art, for example, may use a Bragg reflector layer or a distributed Bragg reflector (DBR) layer. Having angle-selective reflectivity, the DBR layer can reflect light beams with incident angles in a certain range and transmit other light beams with incident angles out of the range. In addition, the angle selection film may be a laminated structure of TiO2 and SiO2. By matching thicknesses of layers in the laminated structure, lights with incident angles greater than 45° are mainly transmitted, while lights with incident angles of less than 45° are mainly reflected. An angle parameter can be adjusted based on different thicknesses of coating films.

The second polarization unit 500 may include one or more second polarizers that are laminated. The second polarizer may be a reflective polarizer. When the second polarization unit 500 includes a plurality of second polarizers that are laminated, directions of light-transmitting axes of all the second polarizers are the same. The following uses a second direction to denote a direction of a light-transmitting axis of the second polarization unit 500. In this case, when lights enter the second polarization unit, only a light vibrating in the second direction can pass through, while lights vibrating in other directions are reflected by the second polarization unit 500.

The light conversion unit 300 may be a phase retarder for converting a vibration direction of a light, for example, may be a quarter-wave plate. The quarter-wave plate may be made of a birefringent wafer having a quartz, calcite, or mica layer with a precise thickness, and have an optical axis parallel to a surface of the wafer. For example, a linearly polarized light is incident to the wafer perpendicularly. An included angle between a vibration direction of the linearly polarized light and an optical axis of the wafer is θ (θ≠0°. Incident light vibration can be decomposed into two components: a component (o vibration) perpendicular to the optical axis and a component (e vibration) parallel to the optical axis. A wave plate capable of generating a λ/4 additional optical path difference between an o light and an e light is referred to as a quarter-wave plate. For another example, when the light conversion unit 300 is a quarter-wave plate, and an included angle between a direction of an optical axis of the quarter-wave plate and the direction of the light-transmitting axis of the first polarization unit 400 is 45°, the light conversion unit 300 may change a polarization direction of the received linearly polarized light by 45°, to form a circularly polarized light.

In addition, the lens 600 may be a lens having a reflective function; and a reflective film may be provided on a surface of the lens 600, to improve a reflection effect of the lens 600. In this way, the lens 600 can reflect back a light passing through the light conversion unit 300 to the light conversion unit 300, so that the light passes through the light conversion unit 300 again, thereby further changing a polarization direction. In addition to a reflective portion formed by the reflective film, the lens 600 may further include a transmissive portion, so that a user can see external environment through the lens 600.

It may be learned from the above discussion, after the lights emitted by the light source 100 pass through the first polarization unit 400, only a linearly polarized light vibrating in the first direction can enter the light inlet 120. The second polarization unit 500 can enable only a polarized light vibrating in the second direction to pass through. Therefore, the first direction and the second direction may be set to different directions. In this way, a light entering the second polarization unit 500 through the light inlet 120 can be prevented from directly passing through. In addition, the angle selection unit 200 can enable only light whose incident angles are in the first range to pass through. Lights whose incident angles are in a second range are reflected by the angle selection unit 200. In this way, among lights entering the angle selection unit 200 through the light inlet 120, a target light beam with a first incident angle is reflected between the angle selection unit 200 and the second polarization unit 500, where the first incident angle is in the second range. The angle selection unit 200 and the second polarization unit 500 are disposed opposite each other. For example, an included angle between the two opposite surfaces of the angle selection unit 200 and the second polarization unit 500 is an acute angle. Therefore, an angle of an incident angle by which the target light beam enters the angle selection unit 200 is changed each time the target light beam is reflected by the second polarization unit 500. The target beam passes through the angle selection unit 200 when the incident angle by which the target light beam enters the angle selection unit 200 is in the first range.

In this implementation, the first polarization unit is disposed on the light-emitting side of the light source; the first surface of the first polarization unit faces the light-emitting surface of the light source; the angle selection unit is disposed opposite the first polarization unit; and the light conversion unit is disposed on the side, away from the first polarization unit, of the angle selection unit. Therefore, light can pass through the angle selection unit 200 after being reflected at least one time between the angle selection unit 200 and the second polarization unit 500; and then pass through the second polarization unit 500 after a vibration direction of the light is converted by the light conversion unit 300. In this way, a distance of propagation, in the optical apparatus, of a light emitted by the light source 100 can be increased, so that an image can be amplified in the optical apparatus. Because the image can be amplified in the optical apparatus, a size of a light inlet in the optical apparatus can be decreased by decreasing a distance between the light source 100 and the optical apparatus, that is, reducing a field of view through which lights emitted by the light source 100 enter the optical apparatus. Therefore, the following problem in the prior art is resolved: An overall thickness of an optical apparatus is large because a large light inlet needs to be formed in the optical apparatus.

Figure 2:
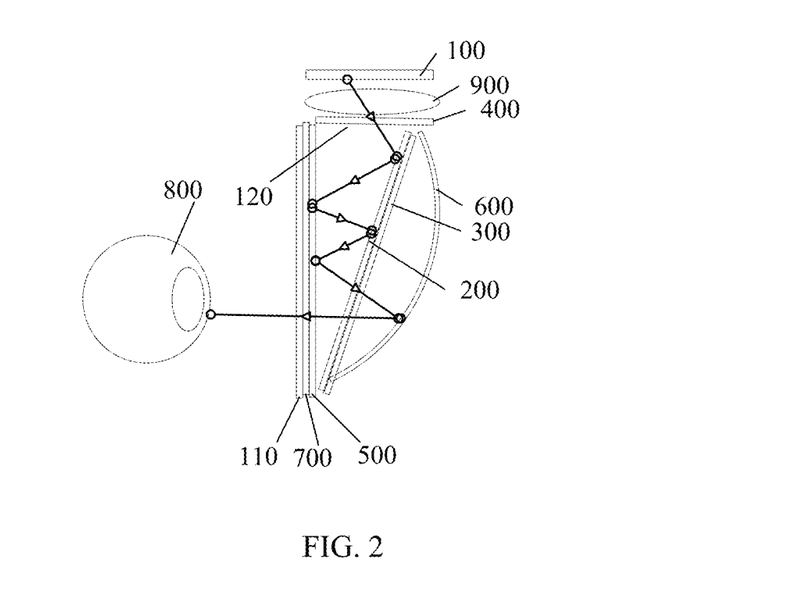
FIG. 2 is a second schematic structural diagram of an optical apparatus according to an embodiment of this application.

FIG. 1 is a diagram of an optical path by which the light passes through the angle selection unit 200 after being reflected once between the angle selection unit 200 and the second polarization unit 500. FIG. 2 is a diagram of an optical path by which the light passes through the angle selection unit 200 after being reflected multiple times between the angle selection unit 200 and the second polarization unit 500.

In some embodiments, a first light emitted by the light source 100 passes through the first polarization unit 400, and is incident to the angle selection unit 200.

In a case that an incident angle of the first light to the angle selection unit 200 meets a first preset condition, the first light passes through the angle selection unit 200 and is transmitted to the light conversion unit 300, the light conversion unit 300 converts the first light into a second light, the second light is reflected back to the light conversion unit 300 by the lens 600, the light conversion unit 300 converts the second light into a third light, and the third light is incident to the angle selection unit 200.

In a case that an incident angle of the third light on the angle selection unit 200 meets a second preset condition, the third light passes through the angle selection unit 200, and is transmitted to and passes through the second polarization unit 500.

The first light may be directly incident to the angle selection unit 200 from the first polarization unit 400, or may be incident to the angle selection unit 200 after being reflected by the second polarization unit 500. The first preset condition may be the incident angle of the first light being in the first range. When the incident angle by which the first light enters the angle selection unit 200 is in the first range, the first light passes through the angle selection unit 200 and is incident to the light conversion unit 300. The light conversion unit 300 converts the first light into the second light. An included angle between a vibration direction of the second light and a vibration direction of the first light is γ. When the light conversion unit 300 is a quarter-wave plate, γ=45°. The second light is reflected back to the light conversion unit 300 by the lens 600. The light conversion unit 300 converts the second light into the third light, where an included angle between the vibration direction of the first light and a vibration direction of the third light is 2γ. The third light passing through the light conversion unit 300 is incident to the angle selection unit 200 again. The second preset condition may be the same as the first preset condition, that is, the incident angle is in the first range. In this case, when the incident angle by which the third light enters the angle selection unit 200 is in the first range, the third light passes through the angle selection unit 200 and is incident to the second polarization unit 500. When the incident angle of the third light is in the second range, the third light is reflected between the angle selection unit 200 and the lens 600, and passes through the angle selection unit 200 until the incident angle of the third light is in the first range. After passing through the angle selection unit 200 and being transmitted to the second polarization unit 500, the third light can pass through the second polarization unit 500, thereby entering a human eye 800 for imaging.

In some embodiments, the second polarization unit 500 is disposed opposite the first polarization unit 400.

That a first light emitted by the light source 100 passes through the first polarization unit 400, and is incident to the angle selection unit 200 includes:

the first light emitted by the light source 100 passes through the first polarization unit 400, is incident to and reflected by the second polarization unit 500, and is then incident to the angle selection unit 200.

Figure 3:
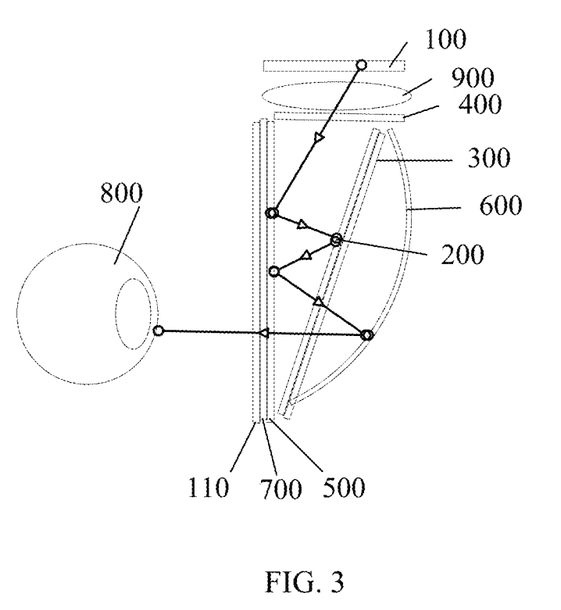
FIG. 3 is a third schematic structural diagram of an optical apparatus according to an embodiment of this application.

In some embodiments, referring to FIG. 3, the first light may alternatively be directly incident to the second polarization unit 500. After being incident to the second polarization unit 500, the first light is reflected by the second polarization unit 500, and is then incident to the angle selection unit 200. The first light passes through the angle selection unit 200 when the incident angle by which the first light enters the angle selection unit 200 is in the first range. The first light is reflected by the angle selection unit 200 and incident to the second polarization unit 500 when the incident angle by which the first light enters the angle selection unit 200 is in the second range. The above process is repeated until the incident angle by which the first light enters the angle selection unit 200 is in the first range; and then, the first light passes through the angle selection unit 200.

In this implementation, the first light is incident to the angle selection unit 200 after being reflected by the second polarization unit 500, which helps increase a distance by which the light emitted by the light source propagates between the second polarization unit 500 and the angle selection unit 200.

In some embodiments, the apparatus further includes an absorption unit 700. The absorption unit 700 is disposed on a side, away from the angle selection unit 200, of the second polarization unit 500. A direction of a light-transmitting axis of the absorption unit 700 is the same as the direction of the light-transmitting axis of the second polarization unit 500.

The absorption unit 700 may include one or more third polarizers that are laminated. The third polarizer may be an absorbent polarizer. Because the direction of the light-transmitting axis of the absorption unit 700 is the same as the direction of the light-transmitting axis of the second polarization unit 500, the absorption unit 700 can enable only the polarized light vibrating in the second direction to pass through. In this way, even if a polarized light vibrating in a direction different from the second direction passes the second polarization unit 500, the polarized light can be blocked by the absorption unit 700, thereby reducing the influence of an interference light on an imaging effect.

Moreover, it can be ensured that a linearly polarized light vibrating in the second direction is transmitted, to facilitate normal imaging.

In some embodiments, an included angle between a second surface of the first polarization unit 400 and a third surface of the second polarization unit 500 is a first angle.

The second surface of the first polarization unit 400 is a surface on a side, facing the second polarization unit 500, of the first polarization unit 400. The third surface of the second polarization unit 500 is a surface on a side, facing the first polarization unit 400, of the second polarization unit 500.

In this implementation, the first angle may be 90°. For example, referring to FIG. 1, the first angle is equal to 90°. In this way, a reflection effect, between the second polarization unit 500 and the angle selection unit 200, of a light entering the space between the second polarization unit 500 and the angle selection unit 200 from the light inlet can be improved.

In some embodiments, the direction of the light-transmitting axis of the first polarization unit 400 is perpendicular to the direction of the light-transmitting axis of the second polarization unit 500.

The light conversion unit 300 may be a quarter-wave plate. In this way, it can be ensured that the included angle between the vibration direction of the first light and the vibration direction of the third light is 90°, and that the vibration direction of the first light is the same as the direction of the light-transmitting axis of the first polarization unit 400. Therefore, the direction of the light-transmitting axis of the first polarization unit 400 is set to be perpendicular to the direction of the light-transmitting axis of the second polarization unit 500, to ensure that the third light obtained after conversion of the light conversion unit 300 can smoothly pass through the second polarization unit 500 and the absorption unit 700, thereby entering the human eye 800 for imaging.

In some embodiments, an included angle between the direction of the light-transmitting axis of the first polarization unit 400 and a direction of a light-transmitting axis of the light conversion unit 300 is a second angle.

In some embodiments, when the direction of the light-transmitting axis of the first polarization unit 400 is perpendicular to the direction of the light-transmitting axis of the second polarization unit 500, the second angle may be 45°. In this way, a polarization direction of a light can be changed by 45° each time after the light passes through the light conversion unit 300, thereby ensuring that the third light passing through the light conversion unit 300 can smoothly pass through the second polarization unit 500.

In some embodiments, an included angle between a fourth surface of the second polarization unit 500 and a fifth surface of the angle selection unit 200 is a third angle. The fourth surface faces the angle selection unit 200. The fifth surface faces the first polarization unit 400.

In some embodiments, referring to FIG. 1, the third angle may range between 10° and 50°. For example, in a near-eye display device, the third angle is set to 27°.

In this implementation, a distance of propagation, in the optical apparatus, of a light emitted by the light source 100 is increased, so that an image can be amplified in the optical apparatus. Because the image can be amplified in the optical apparatus, a size of a light inlet 120 in the optical apparatus can be decreased by decreasing a distance between the light source 100 and the optical apparatus, that is, reducing a field of view through which lights emitted by the light source 100 enter the optical apparatus. Therefore, an overall thickness of the optical apparatus can be reduced. The overall thickness of the optical apparatus can be reduced to less than 15 mm according to the above settings.

In some embodiments, the apparatus further includes a transparent substrate 110. The transparent substrate 110 is disposed opposite the second polarization unit 500 and is disposed on a side, away from the angle selection unit 200, of the second polarization unit 500.

The transparent substrate 110 may be a light-transmitting glass sheet or a light-transmitting plastic sheet. It can be ensured, by disposing the transparent substrate 110, that optical elements in the optical apparatus are protected on the premise that a light can pass through the transparent substrate 110.

In some embodiments, the apparatus further includes a lens group 900. The lens group 900 is disposed between the light source 100 and the first polarization unit 400. A sixth surface of the lens group 900 faces the light-emitting surface of the light source 100.

In this implementation, 1 or N lens groups 900 may be provided, where N is an integer greater than 1. The sixth surface of the lens group 900 is a surface on a side facing the light source 100. Because the lens group 900 is disposed between the light source 100 and the first polarization unit 400, and the sixth surface of the lens group 900 faces the light-emitting surface of the light source 100, a light emitted by the light source 100 needs to pass through the lens group 900 before entering the first polarization unit 400. This improves light distribution of a natural light emitted by the light source 100, and further improves image quality of an image that enters the human eye 800 after being propagated by the optical apparatus.

Figure 4:
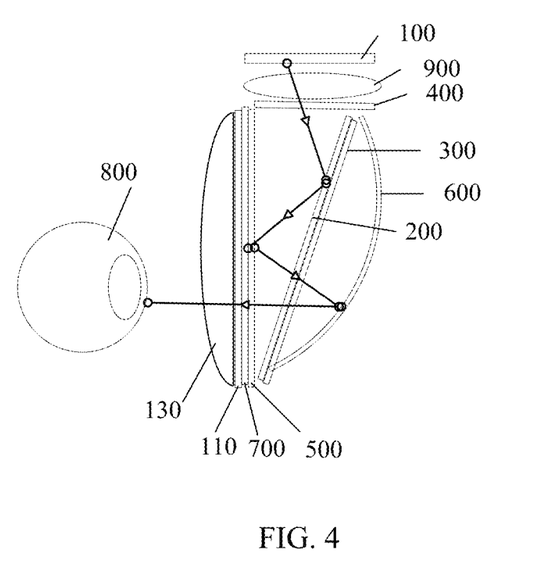
FIG. 4 is a fourth schematic structural diagram of an optical apparatus according to an embodiment of this application.

In some embodiments, referring to FIG. 4, the apparatus further includes a first lens 130. The first lens 130 is parallel to the second polarization unit 500, is disposed on a side, away from the angle selection unit 200, of the second polarization unit 500, and is a convex lens or a concave lens.

In this implementation, because the first lens 130 is disposed on the side, away from the angle selection unit 200, of the second polarization unit 500, a linearly polarized light passing through the first polarizer needs to pass through the first lens 130 before entering the human eye 800. This can improve definition of an image entering the human eye 800, and ensure that even a myopic or presbyopic user can see an image clearly with a naked eye by using the optical apparatus.

In some embodiments, the first lens 130 is detachably connected to the second polarization unit 500.

In some embodiments, the first lens 130 may be disposed on a side, away from the angle selection unit 200, of the absorption unit 700, or on a side, away from the absorption unit 700, of the transparent substrate 110. When the first lens 130 is disposed on the side, away from the absorption unit 700, of the transparent substrate 110, detachable connection between the first lens 130 and the second polarization unit 500 may be implemented by setting a lens mounting position on a side, away from the angle selection unit 200, of the transparent substrate 110 and detachably connecting the first lens 130 to the lens mounting position.

In this implementation, the first lens 130 is detachably connected to the second polarization unit 500, so that it is convenient for different users to replace different types of first lenses 130 according to their own vision needs; and it is also convenient for an orthoscopic user to watch with the first lens 130 removed. Therefore, individual needs of different users can be met.

In some embodiments, both the second polarization unit 500 and the angle selection unit 200 are of sheet-shaped structures, so that a cavity can be formed between the second polarization unit 500 and the angle selection unit 200. In addition, there may alternatively be a solid structure between the second polarization unit 500 and the angle selection unit 200. For example, referring to FIG. 5, the angle selection unit 200 includes a light-transmitting body with a triangular cross section and an angle selection film disposed on a surface of the light-transmitting body. In some embodiments, the angle selection film may be disposed on a surface on a side, close to the light conversion unit 300, of the light-transmitting body. A surface of the angle selection unit 200 is in contact with the second polarization unit 500. Another surface of the angle selection unit 200 is in contact with the light conversion unit 300. A shape of the angle selection unit 200 matches a cavity formed between the second polarization unit 500 and the light conversion unit 300.

Figure 5:
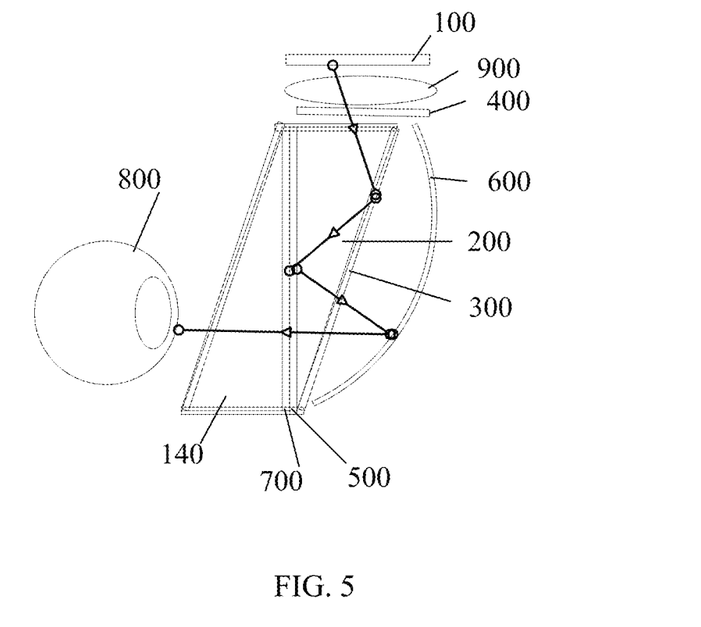
FIG. 5 is a fifth schematic structural diagram of an optical apparatus according to an embodiment of this application.

When the solid structure exists between the second polarization unit 500 and the angle selection unit 200, the optical apparatus further includes a second lens 140. The second lens 140 and the angle selection unit 200 have the same shape and size, and are spliced together to form a solid lens structure with a parallelogram-shaped cross section. The second polarization unit 500 and the absorption unit 700 are disposed in a joint between the second lens 140 and the angle selection unit 200. Owing to the second lens 140, the generation of an interference image can be avoided when a user views the external environment by using the optical apparatus.

An embodiment of this application provides a near-eye display device, including an optical apparatus. The near-eye display device may be a common near-eye display device such as AR glasses. For a structure of the optical apparatus, refer to description of the above embodiment. Details are not described herein again. Because the near-eye display device provided in this embodiment of the present invention uses the structure of the optical apparatus in the above embodiment, the near-eye display device provided in this embodiment of the present invention can implement all beneficial effects of the optical apparatus in the above embodiment.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. An optical apparatus, comprising a light source, an angle selection unit, a light conversion unit, a first polarization unit, a second polarization unit, and a lens, wherein:
   the first polarization unit is disposed on a light-emitting side of the light source;
   a first surface of the first polarization unit faces a light-emitting surface of the light source;
   the angle selection unit is disposed opposite the first polarization unit;
   the light conversion unit is disposed on a side, away from the first polarization unit, of the angle selection unit;
   the second polarization unit is disposed opposite the angle selection unit; and
   the lens is disposed opposite the light conversion unit,
   wherein a first light emitted by the light source passes through the first polarization unit and is incident to the angle selection unit, wherein:
      an incident angle of the first light to the angle selection unit meets a first preset condition, the first light passes through the angle selection unit and is transmitted to the light conversion unit, the light conversion unit converts the first light into a second light, the second light is reflected back to the light conversion unit by the lens, the light conversion unit converts the second light into a third, and the third light is incident to the angle selection unit; or
      an incident angle of the third light on the angle selection unit meets a second preset condition, the third light passes through the angle selection unit, and is transmitted to and passes through the second polarization unit.

2. The optical apparatus according to claim 1, wherein the second polarization unit is disposed opposite the first polarization unit, the first light emitted by the light source passes through the first polarization unit and is incident to the angle selection unit comprises:
   the first light emitted by the light source passes through the first polarization unit, is incident to and reflected by the second polarization unit, and is then incident to the angle selection unit.

3. The optical apparatus according to claim 1, further comprising an absorption unit, wherein the absorption unit is disposed on a side, away from the angle selection unit, of the second polarization unit, and a direction of a light-transmitting axis of the absorption unit is the same as a direction of a light-transmitting axis of the second polarization unit.

4. The optical apparatus according to claim 1, wherein an included angle between a second surface of the first polarization unit and a third surface of the second polarization unit is a first angle.

5. The optical apparatus according to claim 1, wherein a direction of a light-transmitting axis of the first polarization unit is perpendicular to a direction of a light-transmitting axis of the second polarization unit.

6. The optical apparatus according to claim 1, wherein an included angle between a direction of a light-transmitting axis of the first polarization unit and a direction of a light-transmitting axis of the light conversion unit is a second angle.

7. The optical apparatus according to claim 1, wherein an included angle between a fourth surface of the second polarization unit and a fifth surface of the angle selection unit is a third angle; the fourth surface faces the angle selection unit; and the fifth surface faces the first polarization unit.

8. The optical apparatus according to claim 1, further comprising a transparent substrate, wherein the transparent substrate is disposed opposite the second polarization unit and is disposed on a side, away from the angle selection unit, of the second polarization unit.

9. The optical apparatus according to claim 1, further comprising a lens group, wherein the lens group is disposed between the light source and the first polarization unit, and a sixth surface of the lens group faces the light-emitting surface of the light source.

10. A near-eye display device, comprising an optical apparatus, wherein the optical apparatus comprises a light source, an angle selection unit, a light conversion unit, a first polarization unit, a second polarization unit, and a lens, wherein:
   the first polarization unit is disposed on a light-emitting side of the light source;
   a first surface of the first polarization unit faces a light-emitting surface of the light source;
   the angle selection unit is disposed opposite the first polarization unit;
   the light conversion unit is disposed on a side, away from the first polarization unit, of the angle selection unit;
   the second polarization unit is disposed opposite the angle selection unit; and
   the lens is disposed opposite the light conversion unit,
   wherein a first light emitted by the light source passes through the first polarization unit and is incident to the angle selection unit, wherein:
      an incident angle of the first light to the angle selection unit meets a first preset condition, the first light passes through the angle selection unit and is transmitted to the light conversion unit, the light conversion unit converts the first light into a second light, the second light is reflected back to the light conversion unit by the lens, the light conversion unit converts the second light into a third, and the third light is incident to the angle selection unit; or
      an incident angle of the third light on the angle selection unit meets a second preset condition, the third light passes through the angle selection unit, and is transmitted to and passes through the second polarization unit.

11. The near-eye display device according to claim 10, wherein the second polarization unit is disposed opposite the first polarization unit, the first light emitted by the light source passes through the first polarization unit and is incident to the angle selection unit comprises:
   the first light emitted by the light source passes through the first polarization unit, is incident to and reflected by the second polarization unit, and is then incident to the angle selection unit.

12. The near-eye display device according to claim 10, further comprising an absorption unit, wherein the absorption unit is disposed on a side, away from the angle selection unit, of the second polarization unit, and a direction of a light-transmitting axis of the absorption unit is the same as a direction of a light-transmitting axis of the second polarization unit.

13. The near-eye display device according to claim 10, wherein an included angle between a second surface of the first polarization unit and a third surface of the second polarization unit is a first angle.

14. The near-eye display device according to claim 10, wherein a direction of a light-transmitting axis of the first polarization unit is perpendicular to a direction of a light-transmitting axis of the second polarization unit.

15. The near-eye display device according to claim 10, wherein an included angle between a direction of a light-transmitting axis of the first polarization unit and a direction of a light-transmitting axis of the light conversion unit is a second angle.

16. The near-eye display device according to claim 10, wherein an included angle between a fourth surface of the second polarization unit and a fifth surface of the angle selection unit is a third angle; the fourth surface faces the angle selection unit; and the fifth surface faces the first polarization unit.

17. The near-eye display device according to claim 10, further comprising a transparent substrate, wherein the transparent substrate is disposed opposite the second polarization unit and is disposed on a side, away from the angle selection unit, of the second polarization unit.

18. The near-eye display device according to claim 10, further comprising a lens group, wherein the lens group is disposed between the light source and the first polarization unit, and a sixth surface of the lens group faces the light-emitting surface of the light source.

* * * * *